United States Patent [19]

Josefiak et al.

[11] Patent Number: 4,594,207

[45] Date of Patent: Jun. 10, 1986

[54] METHOD FOR THE PRODUCTION OF POROUS BODIES WITH ADJUSTABLE TOTAL PORE VOLUME, ADJUSTABLE PORE SIZE AND ADJUSTABLE PORE WALLS

[75] Inventors: Christoph Josefiak, Kleinwallstadt; Friedbert Wechs, Wörth, both of Fed. Rep. of Germany

[73] Assignee: Akzo NV, Bm Arnhem, Netherlands

[21] Appl. No.: 465,560

[22] Filed: Feb. 10, 1983

[30] Foreign Application Priority Data

Feb. 15, 1982 [DE] Fed. Rep. of Germany ....... 3205289

[51] Int. Cl.[4] .................................................. C08J 9/26

[52] U.S. Cl. ................................ 264/41; 210/500.36; 210/500.23; 264/45.3; 264/49; 264/209.5; 521/63

[58] Field of Search ................... 264/41, 49, 211, 561; 526/348.6; 524/229, 232, 579, 322; 521/63; 210/500.2

[56] References Cited

U.S. PATENT DOCUMENTS

| | | | |
|---|---|---|---|
| 1,707,164 | 3/1929 | Kerplus | 106/164 |
| 2,214,442 | 9/1940 | Spanagel | 204/211 |
| 2,419,277 | 4/1947 | Moncrieff et al. | 204/211 |
| 2,658,879 | 11/1953 | Beaman | 264/182 |
| 2,777,824 | 1/1957 | Leeds | 264/4 X |
| 2,959,570 | 9/1960 | Kessler et al. | 204/17 GF |
| 3,017,238 | 1/1962 | Levinea et al. | 204/17 GF |
| 3,017,372 | 1/1962 | Clark | 524/322 |
| 3,159,592 | 12/1964 | McHush et al. | 524/322 |
| 3,322,611 | 5/1967 | Stevenson | 204/211 |
| 3,582,393 | 6/1971 | Skikada | 524/322 |
| 3,669,740 | 6/1972 | Yamamoto et al. | 204/39 |
| 3,915,912 | 10/1975 | Ishicawa et al. | 204/211 |
| 3,940,405 | 2/1976 | Serad | 264/182 |
| 4,035,459 | 7/1977 | Kesting | 204/187 |
| 4,073,733 | 2/1978 | Yamauchi et al. | 264/49 X |
| 4,107,115 | 8/1978 | Foulks | 204/300 |
| 4,315,880 | 2/1982 | Veeustra | 204/288.8 |
| 4,322,381 | 3/1982 | Jo | 264/561 |
| 4,323,534 | 4/1982 | DesMayais | 204/300 |
| 4,332,765 | 6/1982 | Reinehr et al. | 264/206 |
| 4,490,431 | 12/1984 | Vitzthum et al. | 264/49 X |

FOREIGN PATENT DOCUMENTS

| | | | |
|---|---|---|---|
| 40-12989 | 6/1965 | Japan | 524/322 |
| 385653 | 1/1933 | United Kingdom | 264/209.1 |

*Primary Examiner*—Philip Anderson
*Attorney, Agent, or Firm*—Michael J. Striker

[57] ABSTRACT

Porous bodies, particularly membranes in the form of hollow filaments, are produced by heating a polymer above the upper critical temperature $T_c$ in a mixture of two compounds A and B, liquid and miscible at the dissolving temperature, whereby the employed mixture (polymer, compounds A and B) in liquid aggregate state displays a miscibility gap, the compound A is a solvent for the polymer and the compound B, which preferably is a non-solvent or a swelling agent for the polymer, raises the phase separation temperature of a solution composed of the polymer and compound A. After the dissociation, the components A and/or B if necessary are extracted. Through use of non-toxic substances such as e.g. edible oil as compound A and castor oil as compound B, bodies are obtained which are non-toxic and unobjectionable for use in medical areas and in the foods industry, among others.

27 Claims, No Drawings

METHOD FOR THE PRODUCTION OF POROUS BODIES WITH ADJUSTABLE TOTAL PORE VOLUME, ADJUSTABLE PORE SIZE AND ADJUSTABLE PORE WALLS

BACKGROUND OF THE INVENTION

The invention concerns a method for the production of shaped and unshaped bodies with porous structure, such as fibers, foils, tubing, rods, shaped sections, powders, and the like, particularly though the production of membranes in the form of hollow filaments with adjustable total pore volume, adjustable pore size and adjustable pore walls.

Methods for the production of porous shaped bodies, whereby under "porous" not only a macroporous but also a microporous structure or mixed shapes of both are to be understood, have already been described in DE-OS 2 737 745. There, numerous polymers and liquids are given which can be worked up from a homogeneous solution according to determined methods into shaped bodies with interesting characteristics. Therewith for a determined polymer or a polymer combination, in each case a specific solvent is employed.

According to these methods, mainly shaped-body objects can be produced, with adjustable total pore volume. By altering the polymer portion in the solution, it is possible to vary the pore volume portion in the prepared shaped bodies within broad limits. Difficulties are caused, however, in simultaneously adjusting also the pore size to a desired value, since with increasing pore volume portion, also the size of the individual pores increases. It is indeed possible to control the pore size to a certain extent, by varying the cooling conditions; however, important limits are set, since at some times the cooling process can frequently be controlled very poorly, whereas at other times difficulties also occur upon deformation into shaped bodies, if one deviates in more or less great measure from determined cooling conditions. Thus, with very slow cooling, the shape cannot be retained, whereas too fast a cooling results in difficulties at the outlet of the implement used for the shaping, such as hollow filament nozzles, among others.

A further disadvantage of the method described in the reference is that a noticeable part of the there-recommended liquids is more or less toxic, so that the cost of extracting the toxic liquid after solidification of the shaped body is very high, particularly if the shaped body is supposed to be employed in medicinal fields, in the pharmaceuticals industry, in the foods industry, among others.

Similar problems as have been described above can also occur with the methods for the production of shaped bodies, as they are described for example in DE-OS 2 833 493 and in the German patent application P 30 26 718.6-41 of July 15, 1980.

Although numerous methods are already known which enable one to obtain bodies having porous structure, there exists however a need for improved methods, which lead to products with good and improved characteristics.

SUMMARY OF THE INVENTION

It is therefore an object of the present invention to make available an economical method with which it is possible, in simple manner, to produced shaped and unshaped bodies with porous structure and adjustable total pore volume, adjustable pore size, and adjustable pore walls.

It is moreover an object of the present invention to make available a method, with which these characteristics are reproducibly obtainable, which offers a great process safety and which leads to bodies which can be employed without objection in the fields of medicine, pharmacy and the foods industry, among others.

These objects are attained by a method of the above-described type, which is thereby characterized in that one dissolves a polymer through heating above the upper critical temperature $T_c$ in a mixture of two compounds A and B, which are liquid and miscible at the dissolving temperature, whereby the employed mixture of polymer, compounds A and B displays in liquid aggregate state a miscibility gap, the compound A being a solvent for the polymer and the compound B raising the phase separation temperature of a solution composed of the polymer and the compound A, the solution if necessary being shaped and brought to dissociation and setting by cooling, and the components A and/or B if necessary being extracted.

As compound B, a non-solvent for the polymer can be used. It is also possible to use a compound B which indeed dissolves the polymer, its dissolving temperature with regard to the polymer, however, lying higher by at least 50° C., preferably at least 100° C., than the dissolving temperature of compound A with regard to the polymer. The compound B can also be a swelling agent for the polymer.

In a particularly expedient embodiment of the method according to the present invention, a polymer and a compound A are used which form a binary system, which in liquid aggregate state displays a miscibility gap. As polymer, polyolefins, particularly polypropylene, are very suitable. For polyolefins such as polypropylene, preferably edible oil or edible fat is used as compound A. As compound B there can be used therewith a compound miscible with edible oils or edible fats, which is a non-solvent for the polymer or the dissolving ability of which for the polymer is considerably less than that of edible oils or edible fats. As compound B, particularly suitable is castor oil. Expediently, compound A is soy oil or palm grain oil. The solution is preferably shaped into membranes in the form of hollow filaments or flat foils. A very suitable method for the production of hollow filament membranes involves extruding the solution into a spinning tube, which contains a liquid A as bath liquid, whereby the bath liquid in the spinning tube possesses a temperature below the phase separation temperature, and the membrane and the liquid A are led through the spinning tube in the same direction with approximately the same or only negligibly different linear velocity, the membrane is then under slight tension withdrawn from the spinning tube, and the formed hollow filament structure, after its setting, if necessary is extracted with a solvent. A further expedient method involves extruding the solution into a spinning tube, which contains as bath liquid a mixture of A and B in the same relative ratio amounts as in the solution being extruded, whereby the bath liquid in the spinning tube possesses a temperature beneath the phase separation temperature, and the membrane and the bath liquids are led in the same direction with approximately the same or only negligibly different linear velocities through the spinning tube, the membrane is then withdrawn from the spinning tube under slight tension, and the formed hollow filament structure, after its setting, is extracted with a solvent.

It has been proven to be expedient in many cases to maintain an air space between the outlet surface of the employed hollow filament nozzle and the liquid surface in the spinning tube.

The fluid compound A can additionally be mixed with one or more further liquids, particularly further solvents; also the compound B can be employed in mixture with one or more further compounds. It is possible to perform the method according to the present invention with about 5 up to 90% by weight polymer, which is dissolved in 10 up to 95% by weight of a mixture of the liquid compounds A and B. Preferably, one uses a solution which contains 15 up to 30% by weight polymer and 85 up to 70% by weight of the mixture of the liquid compounds A and B. The mixture of A and B is expediently composed of 60 up to 90% by weight of a solvent for the polymer and 10 up to 40% by weight of a non-solvent or swelling agent for the polymer.

Under porous bodies within the scope of the present invention, are to be understood shaped and non-shaped bodies, such as fibers, hollow filaments, tubes, tubing, stumps, rods or otherwise profiled bodies, blocks, also powdery bodies among others, which contain pores. Therewith can be included so-called macropores or micropores, or combinations of both.

Under "pores" within the scope of the present invention are to be understood hollow cavities, which not only in the interior of the bodies, but also at their surfaces, can be found. Therewith it plays no role whether the hollow cavities are closed, display openings, e.g. at the surface of the bodies, or whether they display one or more connections to adjacent pores. Also the hollow cavities, which connect individual hollow cavities with one another and which deviate frequently in their dimensions from the hollow cavities which they connect, are designated as pores. Therewith the pores can display an optional geometry, e.g. provided as oblong, cylindrical or round hollow cavities or also hollow cavities with more or less irregular form. As radius of a pore or a hollow space is to be understood the radius of an equivalent hollow sphere with the same volume as the hollow space.

Since the term "micropores" is not uniformly used in the literature, and therewith the limits between micropores and other pores cannot be precisely limited by way of a generally valid definition, there should be understood within the scope of the present invention under "micropore" a hollow space with a radius of at most 30 nm.

Macropores are hollow cavities in the sense of the above-given definition, the radius of which lies above 30 nm.

Under solvent for the polymer is to be understood a compound A in which the polymer is completely dissolved into a homogeneous solution upon heating at most to the boiling point of the solvent. It is self-evident that for testing whether the polymer is soluble in the solvent, one should not work with too high a concentration of the polymer, since with such a concentration, on account of the high viscosity, it can frequently no longer be determined whether a really homogeneous solution is provided. It is therefore advantageous to test the dissolving behavior of the solvent with about 10% polymer. Frequently, this solvent displays at room temperature no, or only very little, dissolving behavior for the polymer.

Under non-solvent for the polymer is to be understood a compound B which does not dissolve the polymer into a homogeneous solution upon heating at most to the boiling point of compound B. Preferably, this involves compounds in which under the given conditions the polymer is completely insoluble or only becomes swollen.

Under swelling agents, which under the above-given conditions swell the polymer, are to be understood within the scope of the present invention liquids which indeed become appreciably received by the polymer without, however, forming a single phase. A non-solvent, on the other hand, is withdrawn by the polymer, even at higher temperatures, not at all or only in a very small measure.

In some cases it is also possible to employ a compound B, which is able to dissolve the polymer, whereby this compound B however displays a considerably reduced solubility for the polymer, compared with that of compound A; thus, e.g. in order to dissolve corresponding amounts of polymer, a considerably higher temperature must be used than with employment of solvent A.

The compound A and the polymer form, as follows from the above given statements, in liquid aggregate state at least one range, in which the system is present as homogeneous solution, i.e. in liquid aggregate state forms a single uniform phase.

When such a solution is cooled, different operations can occur. Now it is possible, indeed according to the choice of compound A, initially for there to appear a liquid/liquid dissociation, whereby in equilibrium state two liquid phases lie side-by-side. Upon further cooling, there results a drastic rise in the viscosity of the polymer-rich phase, so that it can hardly be mobile before the actual setting. Upon still further cooling, there forms one or more solid phases, which can be amorphous or crystalline. If necessary, solid phase and liquid phase or liquid phases coexist across wide temperature and concentration ranges. With other types of systems there occurs upon cooling no liquid/liquid phase separation, but there forms immediately a solid phase. This can be represented by the expert through state diagrams. State diagrams of this type are provided, for example, in the Soviet contribution "Faserforschung, Textiltechnik", 1967 (4), pages 118–122 "Ueber die Klassifizierung von Polymerloesungsmitteln" by S. P. Papkoff and S. G. Eftimova (see, particularly, Diagram 2, Type A II). Also in works on the subject of physical chemistry can be found corresponding state diagrams.

The employed compositions of polymer and mixture A and B must be transferrable together into a single homogeneous liquid phase, and display an upper critical dissociation temperature, beneath which a phase separation into two liquid phases occurs. This critical dissociation temperature $T_c$ lies higher than the phase separation temperature of a solution which contains the same portions of polymer and as liquid, however, only the compound A.

It has surprisingly been discovered that through the addition according to the present invention of compound B, the pore size of the obtained porous structures can be controlled. Prerequisite therefor is that the compound B, when it is added to a system composed of polymer and liquid compound A, raises the phase separation temperature. This means e.g. with systems polymer/A with a miscibility gap in liquid aggregate state, that through the addition of compound B, the critical temperature $T_{c1}$ is raised.

For systems polymer and compound A, which in liquid aggregate state display no miscibility gap, there is provided according to the present invention through the addition of B, a system which in liquid aggregate state does display a miscibility gap. Preferably, mixtures can be worked up according to the method of the present invention, with which the polymer and the compound A already form a system, which in liquid aggregate state displays a miscibility gap. As polymer, particularly polyolefins such as preferably polypropylene and polyethylene are employed; also polymers on the basis of acrylates, such as methylacrylate, methylmethacrylate, vinyl compounds such as vinyl chloride and vinyl acetate and copolymers of the mentioned monomers can be worked up. In addition, polyamide, polyester, polyurethane, polycarbonate, among others, can be worked up into porous bodies according to the present invention.

Solvents, which can assume the function of compound A with regard to the employed polymer, are mentioned e.g. in the already cited DE-OS 2 737 745. Obviously, it is possible to also employ other suitable solvents.

For polyolefins, particularly for polypropylene, the function of compound A, particularly edible fats and edible oils, preferably such from a plant basis, be assumed. Therewith are to be mentioned soy oil, palm seed oil, grapeseed oil, peanut, sunflower, corn, palm, sesame, saflower, olive oils, among others, and plant fats such as coconut oil and palm grain fat. In addition, fats hardened through hydrogenation can be employed.

As non-solvent with regard to polyolefin castor oil, glycerine diacetate and -triacetate, polyethyleneglycol, and linseed oil may be mentioned by way of example.

In determined cases it is even possible to choose for B a compound which indeed is able to dissolve the polymer at higher temperatures, its dissolving temperature, however, lying at least 50, preferably 100° C., higher than that of compound A. The system polyethylene/isopropylmyristate/soy oil represents such a preferred composition. In another composition, namely polyethylene/soy oil/castor oil, which is likewise suitable within the scope of the present invention, the soy oil assumes the function of compound A, whereas with the previous example, it assumes the function of compound B. Thus it is possible, indeed according to the chosen composition, for one and the same liquid to be employed once as compound A, once as compound B.

Useful compositions polymer/compound A/compound B are summarized in the following Table. Therewith it is evident that one and the same compound in determined cases can occur not only as compound A but also as compound B.

TABLE

| Polymer | Compound A (dissolver) | Compound B |
|---|---|---|
| polypropylene | soy oil | castor oil |
| | palm grain oil | castor oil |
| | soy oil | linseed oil |
| | palm grain oil | polyethyleneglycol |
| | grapeseed oil | polyethyleneglycol |
| | soy oil | polyethyleneglycol |
| | soy oil | glycerine diacetate |
| | soy oil | glycerine triacetate |
| | palm grain oil | glycerine triacetate |
| | peanut oil | castor oil |
| | sunflower oil | castor oil |

TABLE-continued

| Polymer | Compound A (dissolver) | Compound B |
|---|---|---|
| | corn oil | castor oil |
| | palm oil | castor oil |
| | sesame oil | castor oil |
| | saflower oil | castor oil |
| | coconut fat | castor oil |
| | pig fat | castor oil |
| | goose fat | castor oil |
| | paraffin oil | castor oil |
| | stearyl alcohol | polyethyleneglycol 200 |
| | isopropylmyristate | |
| | castor oil | |
| | decanol | polyethyleneglycol 200 |
| | N,N—bis-(2-hydroxyethyl)-hexadecylamine | castor oil |
| high pressure polyethylene | soy oil castor oil | |
| | palm grain oil | castor oil |
| | isopropylmyristate | castor oil |
| | isopropylmyristate | soy oil |
| polyamide 6 and 66 | ethyleneglycol | glycerine |
| | ethyleneglycol | polyethyleneglycol |
| | glycerine | polyethyleneglycol 600 |
| | caprolactam | polyethyleneglycol 600 |
| | butyrolactone | polyethyleneglycol 200 |
| copolyamide on the basis of ε-caprolactam hexamethylenediamine adipic acid | glycerine | polyethyleneglycol 600 |
| | caprolactam | polyethyleneglycol 600 |
| | butyrolactone | polyethyleneglycol 200 |
| copolyamide on the basis of 20% hexamethylenediamine adipic acid and 80% ε-caprolactam ethanol | ethyleneglycol water | water |
| polymethylmethacrylate | polyethyleneglycol | ethyleneglycol |
| | butyrolactone | water |
| copolymer of vinyl chloride and vinyl acetate | ethylglycol acetate | water |
| | dimethylformamide | ethyleneglycol |
| polyurethane | butyrolactone | glycerine |
| polycarbonate | butyrolactone | glycerine |

The choice of further suitable combinations, particularly suitable compounds B, causes no principal difficulties, with the aid of the given general criteria.

The production of porous bodies from the solutions polymer/compound A/compound B can be performed according to known methods. Therewith can be used customary shaping implements such as broad-slit nozzles, profiled nozzles, ring-slit nozzles, hollow filament nozzles, and the like.

It was particularly surprising that it is possible according to the present invention to produce bodies with the most different shapes, having adjustable pore volume and adjustable size as well as pore walls. Therewith one can control the pore volume, i.e. the total pore volume, which is equated to the total portion of hollow cavities in the shaped body, by means of the total portion of compounds A and B in the mixture. A higher portion of A and B mixture provides also a high pore volume portion in the shaped bodies. The pore size can be controlled through the relative ratio of compound A to compound B, whereby the pore size increases upon increase of the relative portion of B.

According to the invention, total pore volume, pore size and pore walls are reproducibly adjustable; one is no longer directed to methods which work very uncertainly, such as influencing the cooling conditions, varying the concentration, and the like. Thus, it is possible under otherwise similar product conditions to adjust the pore size solely through variation of the relative ratio of A and B. One can produce shaped bodies which without hesitation can be employed in the medicinal area as well as in the foods industry. The method according to the present invention allows mainly the employment of compounds, particularly of compounds such as edible oils, which are completely non-risky. Moreover, the extractability of the bodies within the scope of the process of the present invention is considerably improved in many cases.

In many cases it can be expedient, to leave both components A and B together, or occasionally one of them, in the shaped bodies, and to extract only one component, or even none of the components.

Thus it is possible to avoid the occurrence of allergies, which occur, when during medical treatment shaped bodies are employed which still contain traces of harmful substances.

Membranes, produced according to the present invention, can be employed in many kinds of separation processes. They can be used particularly advantageously in processes in which yeast cells are filtered off, for wine filtration, for acetic acid production. It is also possible to filter off numerous bacteria with membranes so produced.

It is moreover particularly advantageous, that one can also work into the process according to the present invention additives, such as e.g. mineral fillers, which are employed for the improvement of mechanical characteristics. The working in of other additives is also possible.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

In a heatable glass vessel, a mixture of 25 parts polypropylene ($\overline{M}_w$ 450,000) and 75 parts of the solvent mixture set forth in Table 1, column a) composed of soy oil of commercial food quality and castor oil DAB 8, are dissolved. Under intensive stirring and nitrogen atmosphere, the polymer granulates and solvent are brought to the dissolving temperature (Table 1, column b). One observes clearly that at about 155° C. the granulates are transparent, and with increasing temperature become swollen until finally, at solution temperature, a homogeneous, viscous solution is produced.

In order to guarantee an objection-free membrane formation, the solution is ventilated.

TABLE 1

| test no. | (a) solvent mixture soy oil/castor oil | (b) dissolving temperature | type of example |
|---|---|---|---|
| 1 | 100%:0% | ca. 175° C. | not according to the present invention |
| 2 | 95%:5% | ca. 180° C. | according to the invention |
| 3 | 90%:10% | ca. 185° C. | according to the invention |

TABLE 1-continued

| test no. | (a) solvent mixture soy oil/castor oil | (b) dissolving temperature | type of example |
|---|---|---|---|
| 4 | 80%:20% | ca. 195° C. | according to the invention |
| 5 | 70%:30% | ca. 210° C. | according to the invention |

The so prepared solution is extruded through the hollow filament nozzle of a spinning machine into a spinning tube, and formed into hollow filament-shaped membranes. Nitrogen functions as inside filling. After an air stretch of about 1 cm, the filaments pass the approximately 2 m long spinning tube which is flowed through with cooling liquid. As cooling medium serves the particular solvent mixture into which the polymer is dissolved. The temperature is held to 50° C. The flowthrough velocity is adapted to the spinning velocity.

By means of a quick cooling down the hollow filament structure is solidifed at about 120° C. and could be continuously withdrawn from the spinning tube.

The particular phase separation temperatures and spinning parameters are summarized in Table 2.

TABLE 2

| Test No. | Phase Separation Temperature | Melt Temperature/ Nozzle Temperature |
|---|---|---|
| 1 | ca. 150° C. | 190° C. |
| 2 | ca. 155° C. | 190° C. |
| 3 | ca. 158° C. | 190° C. |
| 4 | ca. 170° C. | 190° C. |
| 5 | ca. 190° C. | 210° C. |

After the extraction of the solvent with ethanol heated to about 50° C., the filaments are dried at 50° C.

Indeed according to the employed solvent mixture there were obtained porous membranes with differing pore volumes and pore structure. A greater portion of castor oil provided a higher phase separation temperature and coarse-pored structures.

The most important characteristics and characteristic values are set forth in Table 3.

TABLE 3

| Test No. | Blow Point (bar) | max. pore size (μm) | Pore Volume ($cm^3$/g) | Water Flow (0.1 bar, g/$cm^2$/min) |
|---|---|---|---|---|
| 1 | >2.5 | <0.2 | smaller | 0.01 |
| 2 | 2.08 | 0.31 | | 0.45 |
| 3 | 1.41 | 0.45 | | 0.66 |
| 4 | 1.28 | 0.50 | | 0.85 |
| 5 | 1.1 | 0.58 | larger | 1.16 |

The hollow filaments have an interior lumen of about 300 μm with a wall thickness of about 140 μm. For measuring the blowing points the hollow filaments are immersed in ethanol and coated with nitrogen from the interior side. What is measured is the pressure at which the ethanol becomes displaced from the walls of the hollow filaments by means of the nitrogen, and at the outside the formation of gas bubbles is first recognized. From the determined values, the maximal pore size can be calculated by means of the following equation:

$$d_{max} = \frac{0.63}{P_{max}} \text{ (blow point)}$$

Microscopic examination of the membranes confirmed the determined values.

The pore volumes are determined by means of mercury-porosimetry.

For determining the water flow, the hollow filaments are coated from the inside with distilled water at a pressure of 0.1 bar, after previously having made possible the water flowthrough by means of hydrophilic ethanol.

EXAMPLE 2

According to the manner of operation described in Example 1, a 25% polymer solution, composed of polypropylene ($\overline{M}_w$ 450,000) and (A) palm grain oil (dissolver) and (B) palm grain oil (dissolver)/castor oil (non-dissolver)-mixture (66 parts/34 parts) is produced.

Analogous to Example 1, here also a hollow filament spinning apparatus is employed for membrane formation. What was different was the choice of cooling medium. For this purpose here serves a mixture of 66 parts palm grain oil and 34 parts castor oil.

| Test No. | Solvent palm grain oil/ castor oil | Phase separation temp. ca. °C. | dissolving temp. ca. °C. | spinning temp. ca. °C. | blow point bar |
|---|---|---|---|---|---|
| A | 100%/0% | ca. 150 | ca. 175 | 200 | >2.5 |
| B | 66%/34% | ca. 180 | ca. 210 | 210 | 1.1 |

| Test No. | maximum pore size | type of example |
|---|---|---|
| A | <0.25 μm | not according to the present invention |
| B | 0.58 μm | according to the invention |

EXAMPLE 3

According to the method described in Examples 1 and 2, the polymer solution is prepared with polypropylene ($\overline{M}_w$ 450,000). Here soy oil functions as solvent, and glycerine triacetate as non-solvent.

Composition of the polymer solution:

25% polypropylene

75% soy oil/glycerine triacetate in ratio 67.5 parts:32.5 parts

At a temperature of about 210° C., a homogeneous, viscous solution is obtained. The hollow filaments produced with a spinning temperature of about 205° C. have a blow point of 1.88 bar, which corresponds to a maximum pore size of 0.34 μm.

EXAMPLE 4

In a solvent mixture composed of 77.5 parts isopropylmyristate and 22.5 parts castor oil, a 22.5% polymer solution with high pressure polyethylene LV 1.37 is prepared according to the method described in Example 1. With a spinning temperature of 215° C., the extruded hollow filaments, after extraction with acetone and drying, are provided with stable, highly porous structures.

With the chosen solvent combination, isopropylmyristate is the dissolver, castor oil is the non-dissolving portion. The phase separation temperature came to about 157° C.

EXAMPLE 5

In a glass flange flask, 25 parts polyamide 6 and 75 parts of a solvent mixture, composed of ethylene glycol and glycerine, are placed. In a heating bath, this mixture is brought to the necessary temperature, under intensive stirring in nitrogen atmosphere, in order to obtain a homogeneous solution.

For membrane formation, this polymer solution is coated onto a glass plate. The approximately 150 μm thick foil is quickly cooled in cold water. The initially transparent solution solidifies and is therewith with increasing pore formation first milky, then completely white. After a short dwell time in the cooling medium, the glycol/glycerine could be extracted e.g. with warm acetone or warm water. The membranes, dried at about 50° C., depending upon the composition of the solvent mixture, have different pore structure with different strongly pronounced water-wettability and water suction power. Microscopic cross sections confirm this effect.

With this discontinuous manner of operation it is advantageous to use as brief as possible dissolving periods and to guarantee small water content of the employed solvent, since otherwise polymer decomposition must be reckoned with.

| Test No. | Polyamide | LV | solvent mixture ethyleneglycol/ glycerine % | dissolving temp. ca. °C. | turbidity ca. °C. | pore type | water-wettability |
|---|---|---|---|---|---|---|---|
| 1 | copolyamide on basis of 20% hexamethylenediamineadipic acid and 80% caprolactam | 3.60 | 95/5 | 128 | 100 | larger, more open | very good |
| 2 | copolyamide on basis of 20% hexamethylenediamineadipic acid and 80% caprolactam | 3.60 | 67/33 | 137 | 112 | | |
| 3 | copolyamide on basis of 20% hexamethylenediamineadipic acid and 80% caprolactam | 3.60 | 33/67 | 148 | 122 | | |
| 4 | copolyamide on basis of 20% hexamethylenediamineadipic acid and 80% caprolactum | 3.60 | 5/95 | 158 | 133 | smaller, closed | less |
| 5 | Perlon LV 2.5 | | 95/5 | 147 | 130 | larger, more open | very good |
| 6 | Perlon LV 2.5 | | 67/33 | 157 | 138 | | |
| 7 | Perlon LV 2.5 | | 33/67 | 168 | 147 | | |
| 8 | Perlon LV 2.5 | | 5/95 | 177 | 155 | smaller, closed | less |

EXAMPLE 6

Using the method set forth in Example 5, 25 parts polymethylmethacrylate, as it is acquired from Fa. Röhm under the designation Plexiglas Form Mass 7N, are dissolved in 75 parts of a mixture composed of 77% polyethyleneglycol 66 (dissolver) and 23% ethylenglycol (non-dissolver) at about 150° C. (phase separation temperature about 115° C.).

The membrane smoothed out onto a glass plate could be freed of solvent with warm water. After drying, a highly porous structure is recognized by means of a microscope.

EXAMPLE 7

Proceeding from a stock arrangement of polyurethane, produced on the basis of polyethyleneglycol 1000, diphenylmethanediisocyanate and ethyleneglycol in butyrolactone, a polymer solution is produced through the addition of glycerine as non-dissolver, which has a phase separation temperature of about 120° C.

The composition of the solution is:

25% polyurethane (solid)

75% butyrolactone/glycerine—77:23

Upon formation of the membrane on a glass plate, analogous to Example 5, one obtains after cooling below 60° C. a stable, coherent foil. After the extraction of the solvent mixture with warm water, a water-wettable porous structure is obtained.

For the customary polyamides such as Polyamide 6, Polyamide 12, Polyamide 66 and numerous copolyamides, the following combinations are possible:

Compound A dimethylformamide dimethylacetamide butandiol-(1,4)

hexandiol-(1,6)

sorbite dimethylpropandiol

As compound B, glycerine triacetate is here suitable.

Reference to evidence of mercury porosimetry for characterization of porous materials, as was employed for testing of the bodies according to the present invention, can be found in Chemie-Ing.-Techn. 38. Jahrg. 1966/Heft 12, Seite 1271–1278.

It will be understood that each of the elements described above, or two or more together, may also find a useful application in other types of porous bodies differing from the types described above.

While the invention has been illustrated and described as embodied in a method for the production of porous bodies with adjustable total pore volume, adjustable pore size and adjustable pore walls, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Method for the production of porous bodies, shaped and non-shaped, with adjustable total pore volume, adjustable pore size and adjustable pore walls, comprising dissolving a polymer through heating above the upper critical temperature $T_c$ in a mixture of two compounds A and B, liquid and miscible at the dissolving temperature, the pore volume, pore size and pore walls being adjustable by varying the relative proportions of compounds A and B in the mixture, the employed mixture of polymer, compound A and compound B displaying in liquid aggregate state a miscibility gap, the compound A being a solvent for the polymer and the compound B acting to raise the phase separation temperature of a solution composed of a polymer and the compound A and bringing it to dissociation and setting by means of cooling.

2. Method according to claim 1, wherein a non-solvent for the polymer is employed as compound B.

3. Method according to claim 1, wherein a compound B is used having a dissolving temperature with regard to the polymer lying at least 50° C. higher than the dissolving temperature of compound A with regard to the polymer.

4. Method according to claim 3, using a compound B having a dissolving temperature with regard to the polymer lying at least 100° C. higher than the dissolving temperature of compound A with regard to the polymer.

5. Method according to claim 1, wherein as compound B a swelling agent for the polymer is employed.

6. Method according to claim 1, using a polymer and a compound A which form a system displaying in liquid aggregate state a miscibility gap.

7. Method according to claim 1, wherein as polymer, polyolefin is used.

8. Method according to claim 7, wherein as polymer, polypropylene is used.

9. Method according to claim 7, wherein as compound A, edible oil or edible fat is used.

10. Method according to claim 9, wherein as compound B, a compound miscible with edible oil or edible fat is used, which compound is a non-solvent for the polymer or the dissolving ability of which compound for the polymer is considerably less than that of edible oil or edible fat.

11. Method according to claim 10, wherein as compound B, castor oil is used.

12. Method according to claim 9, wherein as compound A, soy oil is used.

13. Method according to claim 9, wherein as compound A, palm seed oil is used.

14. Method according to claim 1, wherein said solution is shaped into membranes in the form of hollow filaments.

15. Method according to claim 1, wherein the solution is shaped into membranes in the form of flat foils.

16. Method according to claim 14, wherein the solution is extruded into a spinning tube which contains compound A as bath liquid, whereby the bath liquid in the spinning tube possesses a temperature below the phase separation temperature and the membrane and the compound A are led through the spinning tube in the same direction with about the same or only insignificantly different linear velocity, the membrane is then withdrawn from the spinning tube under slight tension, and the formed hollow filament structure, after its solidification, if necessary is extracted with a solvent.

17. Method according to claim 14, wherein the solution is extruded into a spinning tube which contains as bath liquid a mixture of compound A and compound B in the same relative ratio amounts as are present in the solution being extruded, whereby the bath liquid in the spinning tube possesses a temperature below the phase separation temperature and the membrane and the bath liquid are led through the spinning tube in the same direction with about the same or only insignificantly different linear velocity, the membrane is then withdrawn from the spinning tube under slight tension and the formed hollow filament structure, after its solidification, is extracted with a solvent.

18. Method according to claim 16, wherein between outlet surface of an employed hollow filament nozzle and liquid surface in the spinning tube, an air space is maintained.

19. Method according to claim 17, wherein between outlet surface of an employed hollow filament nozzle and liquid surface in the spinning tube, an air space is maintained.

20. Method according to claim 1, wherein the liquid compound A additionally contains one or more further solvents and the compound B is employed in mixture with one or more further compounds.

21. Method according to claim 1, wherein 5–90% by weight polymer is dissolved in 10–95% by weight of the mixture of liquid compounds A and B.

22. Method according to claim 21, wherein 15–30% by weight of polymer is dissolved in 85–70% by weight of the mixture of the liquid compounds A and B.

23. Method according to claim 1, wherein the mixture of A and B is composed of 60–90% by weight of a solvent for the polymer and 10–40% by weight of a non-solvent or swelling agent for the polymer.

24. Method according to claim 1, further comprising the step of shaping the solution.

25. Method according to claim 1, further comprising th step of extracting compound A.

26. Method according to claim 1, further comprising the step of extracting compound B.

27. Method according to claim 1, further comprising the step of extracting compounds A and B.

* * * * *